No. 740,395. PATENTED OCT. 6, 1903.
P. F. CARROLL.
MECHANICAL OVEN.
APPLICATION FILED SEPT. 15, 1902.
NO MODEL.

WITNESSES:
INVENTOR
Philip F. Carroll
BY
Frederick Benjamin
ATTORNEY.

No. 740,395. Patented October 6, 1903.

UNITED STATES PATENT OFFICE.

PHILIP F. CARROLL, OF JOLIET, ILLINOIS.

MECHANICAL OVEN.

SPECIFICATION forming part of Letters Patent No. 740,395, dated October 6, 1903.

Application filed September 15, 1902. Serial No. 123,395. (No model.)

*To all whom it may concern:*

Be it known that I, PHILIP F. CARROLL, a citizen of the United States, residing at Joliet, in the county of Will and State of Illinois, have invented certain new and useful Improvements in Mechanical Ovens, of which the following is a specification.

My invention relates to improvements in the construction and arrangement of mechanical ovens especially designed for baking bread, cakes, biscuit, and the like; and the especial objects of my improvements are to provide an oven of this class of simple and economical construction and operation from which the products may be quickly and readily removed and from which the minimum amount of heat may escape when the pans are being loaded and unloaded.

Having the aforegoing and other objects of novel and useful scope in view, I have designed the oven hereinafter described in detail, and illustrated in the accompanying drawings, which form a part of this application, and in which—

Figure 1:
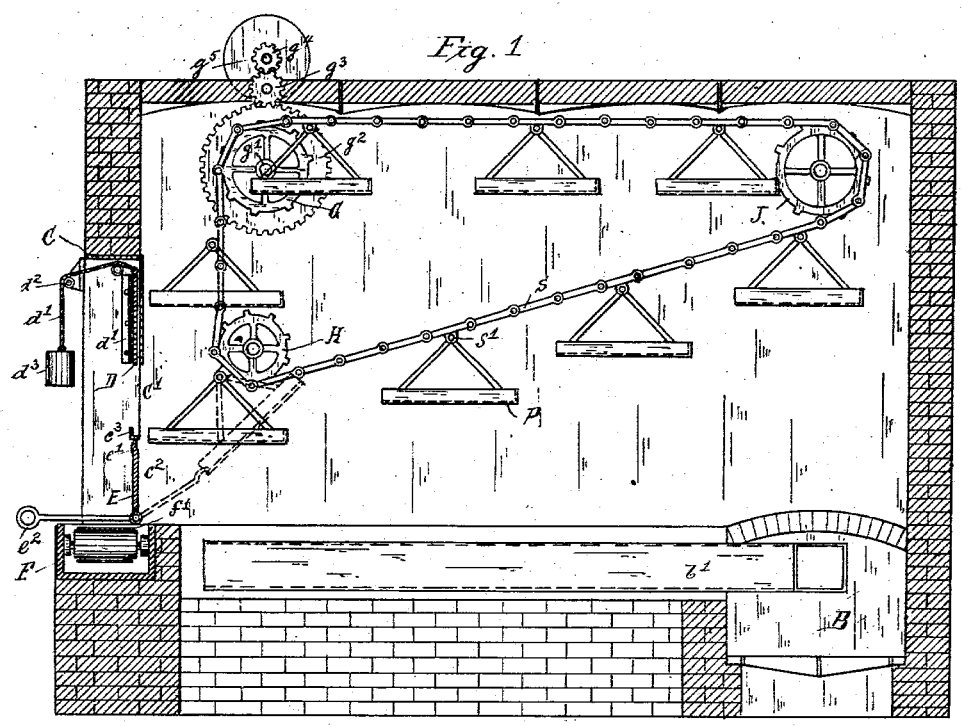
Figure 2:
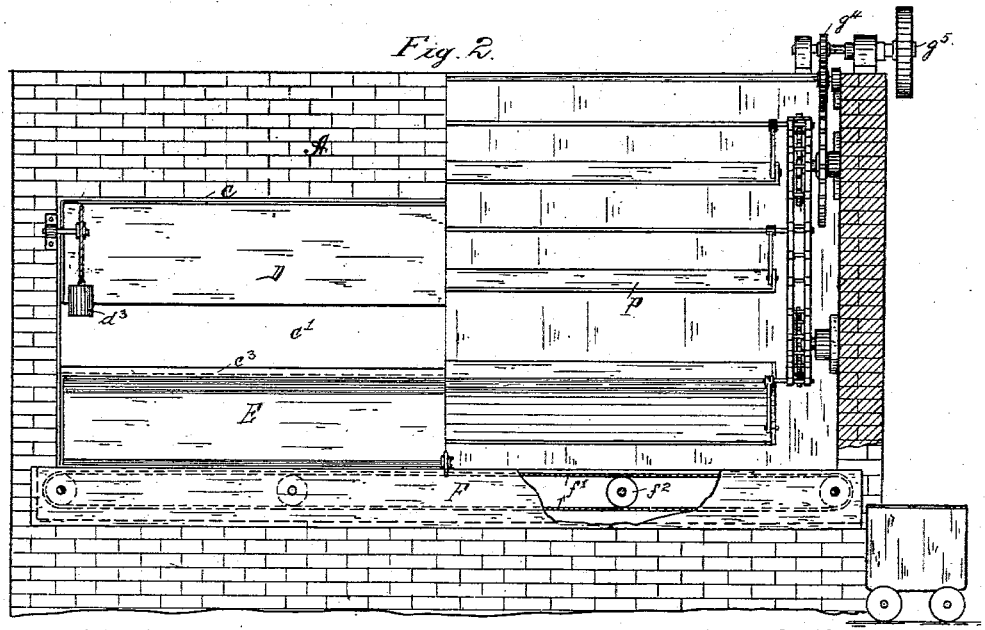

Figure 1 is a view, partly in longitudinal vertical section and partly in side elevation, of an oven constructed and equipped according to my invention. Fig. 2 is a view, partly in front elevation and partly in section, of my improved oven.

Referring to the drawings in detail, A represents a bake-oven constructed chiefly of brick in rectangular form and in any desired size and proportions. With the oven is shown a furnace B, from which lead heat-flues $b'$, which are so arranged relative to the oven that they will conduct thereto the maximum amount of heat, the arrangement of such furnace and flues forming, however, no part of the claimed invention. In the front wall of the oven an opening is left which is provided with a frame C, constructed of iron and of suitable size to permit the loading and unloading of the pans to be described, which extend nearly the width of the oven. There are two openings in the frame, the upper opening $c'$ being adapted to permit the loading of the pans and the lower opening $c^2$ affording an exit for the baked products. The opening $c'$ is closable by a vertically-sliding iron door D, which moves in suitable slideways $d'$ on the frame and is suspended from a cable $d'$, which passes over a pulley $d^2$, secured to the head of the frame and has a weight $d^3$ attached to its free end, said weight adapted to counterbalance the door D. A bar $c^3$ extends across the frame and forms a sill for the door D and subdivides the frame, so that the openings $c'$ and $c^2$ are formed.

The opening $c^2$ is closable by means of a hinged door E, the pivotal or hinge pin of which extends across the frame at the bottom of the opening $c^2$. This door is operated by means of a lever $e^2$, secured to the door in any suitable manner and projecting outwardly in a manner to permit of its being manipulated by hand. The upper edge of the door E has an inwardly-extending flange $e'$, upon which the front edge of the pans rest when they are being loaded, but which is moved out of the path of the pans by depressing the lever $e^2$. When the products have been baked and it is desired to unload the pans, by raising the lever the flange $e'$ engages the front edge of a pan and tilts the latter, as shown by dotted lines in Fig. 1, thus bringing the pan and door in the same inclined plane and permitting the products to slide from the pan onto a tray or preferably onto the conveying or removing means which I have provided.

To remove loaves of bread, rolls, or biscuit and similar products, I provide across the front of the oven a trough or chute F, constructed of any suitable material, with closed sides and bottom, but open top. Mounted in this chute is an endless carrier $f'$, supported on rollers $f^2$ and driven by any suitable means. The trough or chute and the carrier mounted therein are so positioned that the loaves, &c., will slide from the door E directly onto the carrier, and thus be quickly removed and conveyed to boxes arranged at the unloading end of the carrier, thus consuming but little time, and therefore allowing the escape of but little heat during such unloading. By placing the unloading-opening at the bottom of the oven it will be apparent that the minimum amount of heat will escape while such opening is uncovered. It is also apparent that the relative arrangement of the loading and unloading doors or openings is such that while the loaves, &c., are being removed at the lower opening the empty pans may be loaded at the opening above.

The pans P may be of any desired form and are suspended to swing from the pins $s'$ of the sprocket-chains S, which are mounted to travel over the sprocket-wheels G, H, and J, which are arranged as shown. The shaft $g'$ of the sprocket-wheel G has keyed thereon a drive-gear $g^2$, the teeth of which mesh with the teeth of the pinion $g^3$, which in turn is driven by a gear $g^4$, mounted on a suitably-driven shaft $g^5$. The wheel H is mounted in the lower part of the oven and the wheel J in the upper and rear part in the same horizontal plane with the wheel G, thus causing the sprocket-chains, and hence the pans suspended therefrom, to travel in a triangular plane. By this novel arrangement I bring but one pan opposite the unloading-door at a time and am permitted to carry on all the unloading at the bottom of the oven. A further advantage of this construction is that the products travel the greatest distance in the hottest part of the oven; hence bake quickly. A still further advantage is that the products are gradually conveyed from the lowest, and therefore least hot, portion of the oven to the upper, and hence hottest, part of the oven, whereby they are subjected to the varying degrees of heat prevailing at the different heights in the oven, a condition which has not heretofore applied to the horizontal type of mechanical ovens, but has been found only in the vertical or reel forms.

It is apparent that various modifications of details may be made in the construction herein described without departing from the essential features of my invention, which I claim as follows:

1 In a mechanical oven having a discharge-doorway for the baked products, a series of swinging pans adapted to traverse the oven and be successively presented at said doorway, and a closure for said doorway adapted when opened to tilt said pans to discharge the contents thereof.

2. In a mechanical oven having separate loading and discharge doorways and separate doors therefor, a series of swinging pans adapted to traverse the oven and be successively presented at said doorways, and the door for the discharge-doorway adapted when opened to operate the pans to discharge the contents thereof.

3. In a mechanical oven having an unloading-opening, a series of swinging pans adapted to travel in a triangular plane only one point of which is opposite said opening, a closure for said opening said closure adapted to engage the front edge of said pans in succession and to tilt same substantially in the manner and for the purpose set forth.

4. In a mechanical oven having a doorway in its lower part, said doorway divided into an upper part for loading the oven-pans, and into a lower part for unloading said pans, a sliding closure for the upper part and an inwardly-swinging closure for the lower, substantially as described.

5. In a mechanical oven having a doorway in its lower part, a hinged door for the lower part of said doorway, a series of pans adapted to travel in a triangular plane one point of which is opposite said lower part, said door adapted to tilt said pans in succession.

6. In a mechanical oven, a series of pans mounted to swing horizontally from an endless traveling belt, means for tilting said pans whereby their contents will be discharged by gravity said means consisting of an inwardly-swinging door, and a traveling carrier adapted to receive the contents of said pans as discharged.

In testimony whereof I affix my signature in presence of two witnesses.

PHILIP F. CARROLL.

Witnesses:
R. G. ROBERTS,
F. BENJAMIN.